(No Model.)
L. R. CHAMBLISS.
VEHICLE WHEEL.
No. 604,726. Patented May 31, 1898.
Fig. 1.
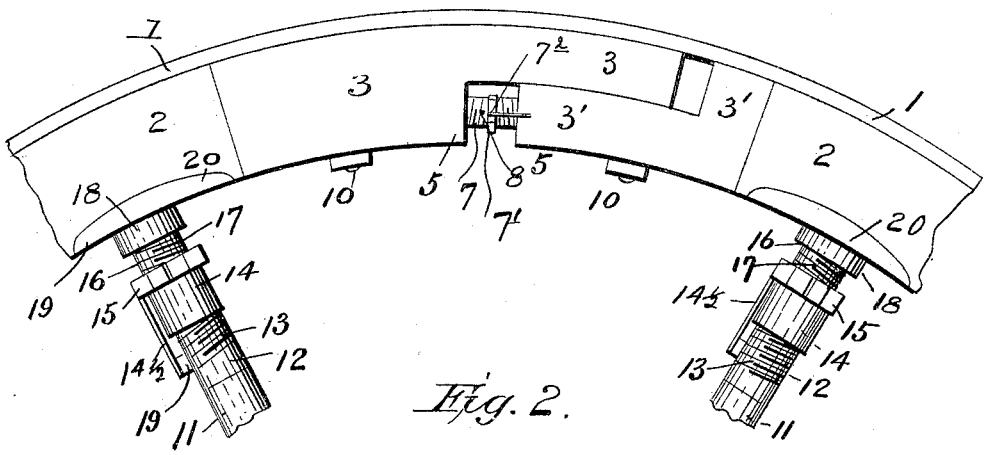
Fig. 2.
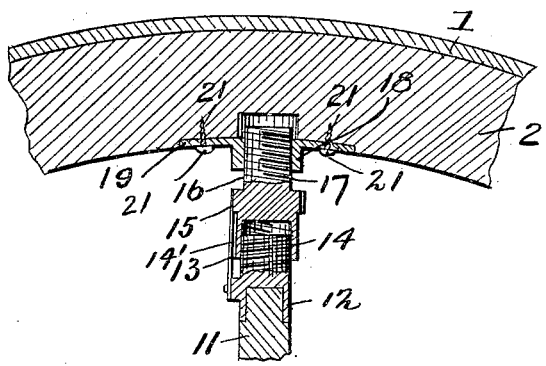
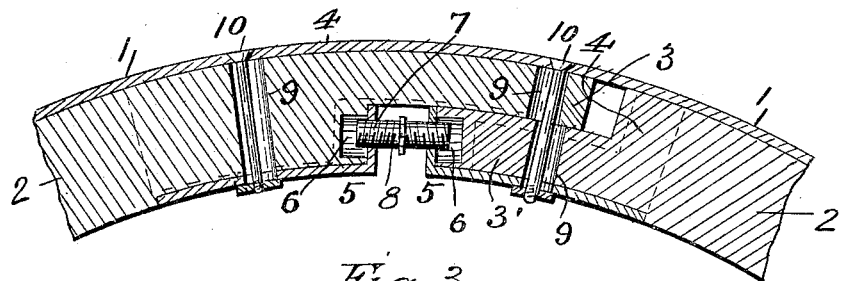
Fig. 3.
Witnesses
F. L. Ourand
Geo. J. Weber
Inventor
Lee R. Chambliss
By John L. Duffie
Attorney

UNITED STATES PATENT OFFICE.

LEE R. CHAMBLISS, OF LANGSTON, OKLAHOMA TERRITORY, ASSIGNOR OF ONE-HALF TO CLEMENT B. BLACK, OF SAME PLACE.

VEHICLE-WHEEL.

SPECIFICATION forming part of Letters Patent No. 604,726, dated May 31, 1898.

Application filed December 18, 1897. Serial No. 662,386. (No model.)

*To all whom it may concern:*

Be it known that I, LEE R. CHAMBLISS, a citizen of the United States, residing at Langston, in the county of Logan and Territory of Oklahoma, have invented certain new and useful Improvements in Vehicle-Wheels; and I do hereby declare the following to be a full, clear, and exact description of the invention, such as will enable others skilled in the art to which it appertains to make and use the same.

My invention is an expansion vehicle-wheel; and it consists in certain devices for lengthening the spokes, expanding the fellies, so as to tighten the tire, and devices to lock the nuts.

In the accompanying drawings, Figure 1 is a face view of a section of my wheel, embracing my device for lengthening the spokes, expanding the fellies, and locking the bolts. Fig. 2 is a section through the tire, a felly, my device for lengthening the spoke, and device for locking the bolt. Fig. 3 is a longitudinal sectional view of Fig. 1.

My invention is described as follows:

1 is the tire.

2 are the fellies.

3 and 3' are metal laps secured to the end of the fellies. These laps 3 3' are made of heavy sheet metal and are hollow, or they may be cast, and the wood felly fills up the hollow, as indicated by the dotted lines 4. The abutments 5 5 of the laps 3 3' are provided with right and left threaded recesses 6, into which is screwed a right and left threaded bolt 7, having a perforation 8. The laps 3 3' and the abutting ends of the fellies 2 are provided with slots 9, so that the parts may accommodate themselves to the contraction or expansion of the tire.

The tire 1, the fellies 2, and the laps 3 3' are secured together by bolts and nuts 10.

On the outer ends of the spokes 11 are secured thimbles 12, having a solid extension the full size of the spoke and on it a right-handed thread 13. Over this threaded thimble 12 works a threaded nut 14, having a wrench enlargement 15. Integral with said threaded nut 14 and extending directly outward therefrom is a bolt 16, provided with a right-handed thread 17, which screws into a corresponding threaded socket 18. This socket is provided with a plate 19 and flanges 20, (see Fig. 1,) and said plate is secured to the inner face of the felly by screws 21.

When the tire becomes loose, I run a lever into the perforation 8, raise the free end of the lock-bar $7^2$ with the point of a knife or some other like instrument, and turn the bolt 7. This enlarges the distance between the abutments 5 and runs the fellies out up against the tire until the tire is perfectly tight, the slots 9 having sufficient space to allow for this movement. While the bolt 7 is being turned the lock-bars $14\frac{1}{2}$ are raised, and the nuts 14 are also gradually turned, keeping the sockets 18 tight up against the inner face of the fellies.

The bolt 7 has a slotted enlargement 7', into the slots of which fits the free end of a spring lock-bar $7^2$, the other end of which is rigidly secured to one of the laps 3 or 3'. This lock-bar fitting into the slots of the enlargement 7' serves to lock the threaded bolt 7. The wrench enlargements 15 are also provided with slots, into which the free ends of spring lock-bars $14\frac{1}{2}$ fit, the other ends being rigidly secured one to each thimble 12. These lock-bars $14\frac{1}{2}$ fitting into the said slots serve to lock the nuts 14.

Having described my invention, what I claim as new, and desire to secure by Letters Patent, is—

In combination with the felly, the socket 18, provided with the plate 19 and flanges 20; the bolt 16, having right-hand threads 17; the slotted wrench enlargement 15, integral with said bolt; the left-hand-threaded nut 14, integral with said enlargement; thimble 12, secured on the outer end of the spoke 11, and having a threaded bolt extension working in the nut 14, and the spring lock-bar $14\frac{1}{2}$ catching in the slot of the wrench enlargement 15, substantially as shown and described and for the purposes set forth.

In testimony whereof I affix my signature in presence of two witnesses.

LEE R. CHAMBLISS.

Witnesses:
GEO. WASHINGTON CLARK,
ANDREW MACKEY.